(12) United States Patent
Jung et al.

(10) Patent No.: US 9,330,313 B2
(45) Date of Patent: May 3, 2016

(54) GLASS TYPE MOBILE TERMINAL

(71) Applicant: LG ELECTRONICS INC., Seoul (KR)

(72) Inventors: Juyung Jung, Seoul (KR); Hyunghun Song, Seoul (KR)

(73) Assignee: LG Electronics Inc., Seoul (KR)

( * ) Notice: Subject to any disclaimer, the term of this patent is extended or adjusted under 35 U.S.C. 154(b) by 387 days.

(21) Appl. No.: 13/904,871

(22) Filed: May 29, 2013

(65) Prior Publication Data

US 2014/0152696 A1 Jun. 5, 2014

(30) Foreign Application Priority Data

Dec. 5, 2012 (KR) ........................ 10-2012-0140408

(51) Int. Cl.
| G09G 5/00 | (2006.01) |
| G06K 9/00 | (2006.01) |
| G06F 3/01 | (2006.01) |
| G06K 9/22 | (2006.01) |
| G06Q 10/10 | (2012.01) |

(52) U.S. Cl.
CPC ............ *G06K 9/00671* (2013.01); *G06F 3/011* (2013.01); *G06F 3/017* (2013.01); *G06K 9/222* (2013.01); *G06Q 10/109* (2013.01)

(58) Field of Classification Search
None
See application file for complete search history.

(56) References Cited

U.S. PATENT DOCUMENTS

| 8,209,183 B1* | 6/2012 | Patel ......................... G06K 9/72 382/181 |
| 8,433,722 B2* | 4/2013 | Shin .................... G06F 17/3087 345/633 |
| 8,792,750 B2* | 7/2014 | Boncyk ............. G06F 17/30247 382/305 |
| 8,878,750 B1* | 11/2014 | Park ................... G06K 9/00221 345/156 |
| 2010/0299021 A1 | 11/2010 | Jalili |
| 2011/0149101 A1 | 6/2011 | Kim et al. |
| 2011/0221656 A1 | 9/2011 | Haddick et al. |
| 2011/0285829 A1 | 11/2011 | Mori et al. |
| 2012/0087580 A1 | 4/2012 | Woo et al. |
| 2012/0115543 A1 | 5/2012 | Lin |
| 2013/0027430 A1* | 1/2013 | Matsuda ................. G06F 3/011 345/633 |
| 2013/0050258 A1* | 2/2013 | Liu ....................... G02B 27/017 345/633 |
| 2013/0141605 A1* | 6/2013 | Kim ........................ G06T 11/60 348/222.1 |
| 2013/0147836 A1* | 6/2013 | Small ...................... G06F 3/011 345/633 |
| 2013/0169536 A1* | 7/2013 | Wexler ................. G09B 21/008 345/158 |
| 2013/0188886 A1* | 7/2013 | Petrou ..................... G06F 3/048 382/305 |
| 2013/0194164 A1* | 8/2013 | Sugden ................ G02B 27/017 345/8 |
| 2013/0271584 A1* | 10/2013 | Wexler ............... G06K 9/00671 348/62 |
| 2013/0278631 A1* | 10/2013 | Border ................. G02B 27/017 345/633 |

(Continued)

FOREIGN PATENT DOCUMENTS

| CN | 102062946 A | 5/2011 |
| CN | 102256144 A | 11/2011 |

(Continued)

*Primary Examiner* — Ryan R Yang
(74) *Attorney, Agent, or Firm* — Birch, Stewart, Kolasch & Birch, LLP

(57) ABSTRACT

A glass type mobile terminal including a transparent screen; a frame configured to secure the transparent screen in front of a user's eyes wearing the glass type mobile terminal; a camera mounted to the frame and configured to photograph an image in front of the user's eyes; a memory; an image recognition unit configured to extract information from the image photographed by the camera; and a controller configured to compare the extracted information with related information stored in the memory, and display the related information to the transparent screen on the transparent screen along with the captured image.

20 Claims, 22 Drawing Sheets

(56) References Cited

U.S. PATENT DOCUMENTS

| | | | | |
|---|---|---|---|---|
| 2013/0293530 A1* | 11/2013 | Perez | G06K 9/00671 | 345/418 |
| 2013/0328926 A1* | 12/2013 | Kim | H04N 5/23293 | 345/633 |
| 2014/0098130 A1* | 4/2014 | Fein | G06T 19/006 | 345/633 |
| 2014/0111542 A1* | 4/2014 | Wan | G06F 17/30253 | 345/633 |
| 2014/0176705 A1* | 6/2014 | Ibamoto | A01G 7/00 | 348/135 |
| 2014/0184643 A1* | 7/2014 | Friend | G09G 3/003 | 345/633 |
| 2014/0204191 A1* | 7/2014 | Takai | G02B 27/017 | 348/77 |
| 2015/0227795 A1* | 8/2015 | Starner | G06K 9/00671 | 345/156 |

FOREIGN PATENT DOCUMENTS

| | | |
|---|---|---|
| WO | WO 2005/017820 A1 | 2/2005 |
| WO | WO 2011/132373 A1 | 10/2011 |

\* cited by examiner

FIG. 22

| Date | Use details | Amount | Income | card | Accumulated expenditure |
|---|---|---|---|---|---|
| November 5 | Paris baguette | 2,500 | | Cash | 1,320,500 |
| November 6 | Kyobo Book Store | 12,500 | | XX card | 1,333,000 |
| November 7 | Emart | 38,250 | | OO card | 1,371,250 |
| November 8 | Pusan Hwaleo-hwae late-night meal town | 76,000 | | OO card | 1,447,250 |

GLASS TYPE MOBILE TERMINAL

CROSS-REFERENCE TO A RELATED APPLICATION

Pursuant to 35 U.S.C. §119(a), this application claims the benefit of earlier filing date and right of priority to Korean Application No. 10-2012-0140408, filed on Dec. 5, 2012, the contents of which are hereby incorporated by reference herein in their entirety.

BACKGROUND OF THE INVENTION

1. Field of the Invention

The present invention relates to a glass type mobile terminal including a camera and a transparent screen, which can acquire and use information easily with leading a daily life.

2. Discussion of the Related Art

Generally, terminals can be classified into mobile terminals and stationary terminals. In addition, the mobile terminals can be further classified into handheld terminals and vehicle mount terminals. Further, a mobile terminal can perform various functions such as data and voice communications, capturing images and video via a camera, recording audio, playing music files and outputting music via a speaker system, and displaying images and video on a display.

Recently, interest in wearable mobile terminals is rising for user convenience and research is in progress on various types of mobile terminals mounted to glasses, bracelets and clothes.

SUMMARY OF THE DISCLOSURE

An object of the present invention is to provide a glass type mobile terminal including a camera and a transparent screen, which can acquire and use information easily helping the user in their daily life.

To achieve these objects and other advantages and in accordance with the purpose of the invention, as embodied and broadly described herein, a glass type mobile terminal includes a transparent screen; a frame configured to secure the transparent screen in front of the user's eyes; an audio output module configured to transmit sound to the user; a camera mounted to the frame to photograph an image in front of the user's eyes; a memory configured to store input/output information therein; an image recognition unit configured to extract information from the image photographed by the camera; and a controller configured to perform at least one of storing the information extracted from the image in the memory, comparing the extracted information with related information stored in the memory, and outputting the related information to the transparent screen or the audio output module.

The image recognition unit may extract the information when the camera photographs the same image for more than a preset time period. Alternatively, the image recognition unit may extract information related to the object, When one object occupies a preset range of areas possessed by the image.

According to a first embodiment of the present invention, the image may include a calendar, and the extracted information may include the year, month and date of the calendar and a memo written in the calendar.

According to a second embodiment of the present invention, the image may be a memo and the information may be a character written on the memo. The controller may display stored-information corresponding to the character written in the memo in a preset level or more on the transparent screen.

According to a third embodiment of the present invention, the image may include an object and the information may be an image of the object photographed at one or more angles, and the controller may compare the photographed image with an image of a designated object stored in the memory and determines whether the photographed object corresponds to the image of the designated object.

At this time, the glass type mobile terminal may further include a location information module configured to recognize the user's location, wherein the controller records the user's location in the memory as a log record for the designated object, When the photographed object corresponds to the designated object and the user can read the log record.

Alternatively, the controller may output the stored information related to the designated object to the transparent screen or output the stored information via the audio output module, When the photographed image corresponds to the designated object.

The glass type mobile terminal may further include a microphone configured to convert a sound near the glass type mobile terminal into a digital signal, wherein the image is a bill or coin, and the information is the amount of bills or coins and the controller compares voice information related to the amount of the money acquired by the microphone with the amount of the bills or coins to calculate the change and outputs the calculated change to the transparent screen or outputs the calculated change via the audio output module.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 19 to 22 are diagrams illustrating an operational state of the glass type mobile terminal according to a still further embodiment of the present invention.

DESCRIPTION OF SPECIFIC EMBODIMENTS

In the following detailed description, reference is made to the accompanying drawing figures which form a part hereof, and which show by way of illustration specific embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Figure 1:
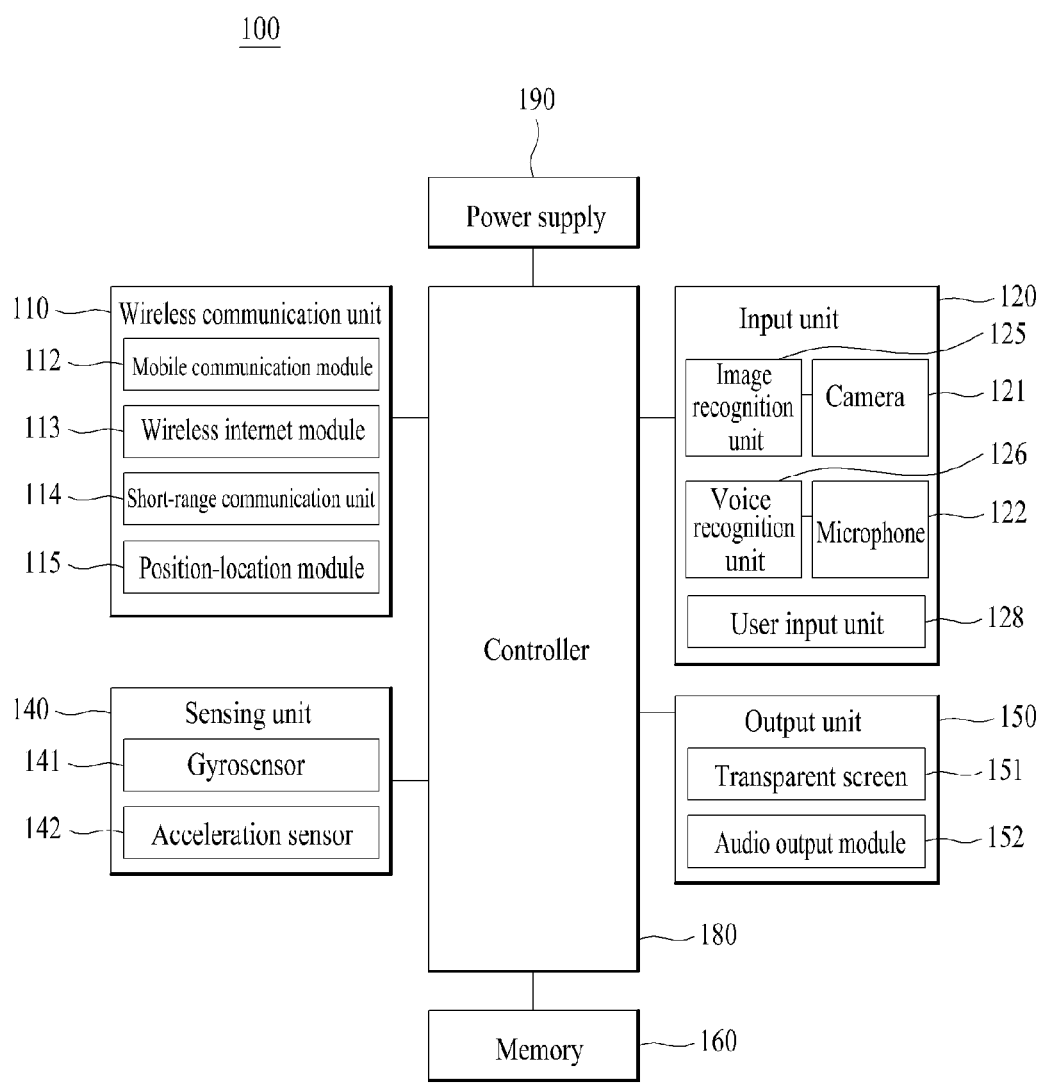
FIG. 1 is a block diagram of a glass type mobile terminal according to one embodiment of the present invention.

FIG. 1 is a block diagram of a glass type mobile terminal 100 in accordance with an embodiment of the present invention. FIG. 1 shows the glass type mobile terminal 100 according to one embodiment of the present invention includes a wireless communication unit 110, an input unit 120, a sensing unit 140, an output unit 150, a memory 160, a controller 180, a power supply unit 190 and the like. FIG. 1 shows the glass type mobile terminal 100 having various components, but it is understood that implementing all of the illustrated components is not a requirement. Greater or fewer components may alternatively be implemented.

In the following description, the above elements of the glass type mobile terminal 100 are explained in sequence.

First of all, the wireless communication unit 110 typically includes one or more components which permits wireless communication between the glass type mobile terminal 100 and a wireless communication system or network within which the glass type mobile terminal 100 is located. For instance, the wireless communication unit 110 can include a broadcast receiving module, a mobile communication module 112, a wireless internet module 113, a short-range communication module 114, a position-location module 115 and the like.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), and WCDMA (Wideband CDMA) and so on. Such wireless signals may represent audio, video, and data according to text/multimedia message transmission and reception, among others.

The wireless internet module 113 supports Internet access for the glass type mobile terminal 100. This module may be internally or externally coupled to the glass type mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the glass type mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 can calculate speed information by continuously calculating a real-time current location.

Referring to FIG. 1, the input unit 120 is configured to provide audio or video signal input to the glass type mobile terminal 100. As shown, the input unit 120 includes a camera 121 and a microphone 122. The camera 121 receives and processes image frames of still pictures or video, which are obtained by an image sensor in a video call mode or a photographing mode. In addition, the processed image frames can be displayed on the transparent screen 151.

The image frames processed by the camera 121 can be stored in the memory 160 or can be externally transmitted via the wireless communication unit 110. Optionally, at least two cameras 121 can be provided to the glass type mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 When of a call mode. The microphone 122 typically includes assorted noise removing algorithms to remove noise generated in the course of receiving the external audio signal.

An image recognition unit 125 is a device configured to extract information from an image photographed by the camera 121 and the image recognition unit 125 may identify the photographed image. When the photographed image has a character, the image recognition unit converts the character into text data. When the image has a plurality of objects, the image recognition unit extracts an object which will be compared with information stored in the memory 160.

When the camera 121 photographs a motion picture, the motion picture includes still images and the image recognition unit 125 acquires information of all the still images and the controller processes the acquired information. However, this process might cause unnecessary waste. In addition, if such unnecessary information is extracted and provided to a user, the user using the glass type mobile terminal 100 wearable like glasses may be inconvenienced.

When the user presses the user input unit 128 provided in the frame or uses a voice command for acquiring image information, the user can extract appropriate information. Alternatively, when looking at one object for more than a preset time period, the camera 121 may photograph the same object for more than a preset time period and information on the object may be extracted.

Alternatively, when the user approaches a specific object, the object occupies a large area of the user's view and the image recognition unit 125 can determine that the user is looking at the corresponding object. Hence, when one object of the images recognized by the camera 121 occupies a preset range of images composing the motion picture, information on the object may be extracted.

Alternatively, the image recognition unit 125 may recognize a gesture created by the user and process the input gesture as a user command. For example, the image recognition unit 125 may recognize a circle drawn by the user as "yes" or perform a function of selecting a character or object located in the circle.

A voice recognition unit 126 can convert the user's voice input via the microphone 1222 into text data or recognize the user's voice as a specific command (hereinafter, "a voice command"). The glass type mobile terminal 100 according to an embodiment of the present invention can include a keyboard. However, a function of the voice recognition unit 126 configured to recognize the user's voice command is convenient so as to activate the functions of the mobile terminal 100.

That is, providing the glass type mobile terminal 100 with a keyboard may include some disadvantages. However, the glass type mobile terminal 100 may include a button type user input unit 128 on the frame and thus a command used frequently can be input via the button type user input unit 128. For example, the user can input a command for photographing an image watched by the user or extracting information from the image, or a command for controlling a volume of a sound output from the audio output unit 152 via the button type user input unit 128.

Various types of input units are applicable as the user input unit 128 and include a module for recognizing a physical pressure from a metallic dome formed therein to generate a signal.

In addition, the sensing unit 140 senses a state of the mobile terminal 100 and a user surrounding environment and in FIG. 1 includes a gyrosensor 141 and an acceleration sensor 142. The gyrosensor 141 is a device configured to sense a tilted phase of the mobile terminal 100 and tilted variation in x, y and z axes, and it can be called as an angular velocity sensor. The gyrosensor senses a rotational movement with respect to each axis to sense tilting and shaking of the mobile terminal case.

A gyrosensor has a spinning top, with three axes and such a gyrosensor is developed to have an improved precision and a compact size such as an optical gyrosensor or a vibration gyrosensor recently, such that a gyrosensor can be mountable in compact-sized electronics including a mobile terminal. In addition, 6-axis sensor realized by MEMS module can be used as the gyrosensor 141. The gyrosensor 141 applied to the present invention is not limited to those types mentioned above and all types of gyrosensors capable of sensing tilting and motion of the glass type mobile terminal 100 are applicable to the present invention.

The acceleration sensor 142 can measure a dynamic force, for example, an acceleration of the glass type mobile terminal 100 and it can detect vibration, shocks and so on from acceleration change. When an object having mass is accelerated, a force is generated and variation of the force is sensed by the acceleration sensor 142.

Further, the output unit 150 generates outputs relevant to the senses of sight, hearing, touch and the like. And, the output unit 150 includes the transparent screen 151, an audio output module 152 and the like.

The transparent screen 151 is arranged in front the user's eyes and it is similar to a lens of glasses. The transparent screen arranged in front of the user's eyes allows the user to see objects located in front and it may be transparent and configured to output a text or image to a screen so as to provide the user with information.

As a representative example for the transparent display, there is TOLED (transparent OLED) or the like. A rear configuration of the transparent screen 151 can be implemented in the optical transmittive type as well. In this configuration, a user can see an object in rear of a terminal body via the area occupied by the transparent screen 151 of the terminal body.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The memory 160 can store programs configured for the controller 180 to process and control and to implement a function for temporarily storing input/output data. The memory 160 can store new input data therein and extract the stored data. A storage function of the memory 160 may be expanded by an SD card or an auxiliary storage device.

In addition, the controller 180 generally controls an overall operation of the mobile terminal 100. For example, the controller 180 may control the wireless communication unit to transmit/receive various signals or process the input data or control the transparent screen 151 and the audio output unit, only to provide information to the user. The image recognition unit 125 and the voice recognition unit 126 mentioned above may be provided in the controller as parts.

The controller 180 according to an embodiment of the present invention may extract information from the image acquired by the camera 121 and compare the extracted information with the stored information (S31). Also, the controller 180 may store the extracted information in the memory 160 (S32), output associated information extracted from the memory 160 to output the extracted information to the transparent screen 151 or search for the associated information on the internet (S34) (see FIG. 3).

The power supply unit 190 provides power required by the various components for the glass type mobile terminal 100. The power may be internal power, external power, or combinations thereof. Further, a battery may include a built-in rechargeable battery and may be detachably attached to the terminal body for a charging and the like.

Various embodiments described herein may be implemented in a computer-readable medium using, for example, computer software, hardware, or some combination thereof.

Figure 2:
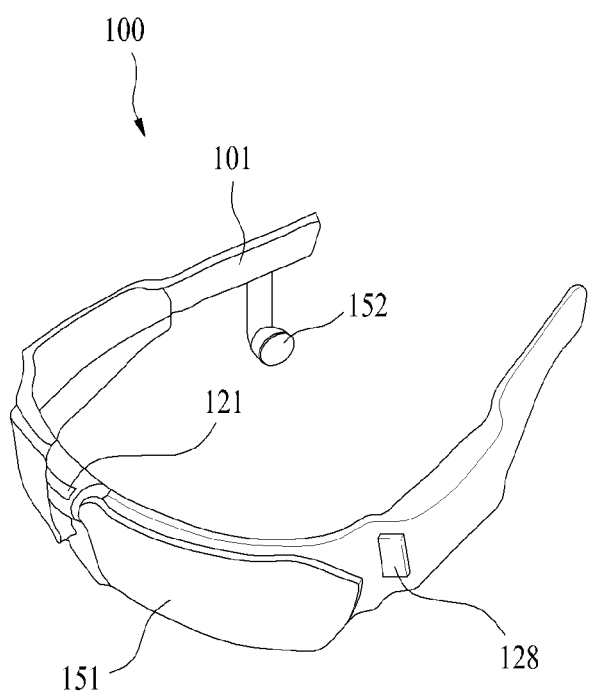
FIG. 2 is a front perspective diagram of the glass type mobile terminal according to one embodiment of the present invention.

Next, FIG. 2 illustrates the glass type mobile terminal 100 according to an embodiment of the present invention including the transparent screen 151, the frame 101, the camera 121 and the audio output unit 152. The transparent screen 151 allows the user to see objects located in front, when the user wears the glass type mobile terminal and to provide the user with various information output thereon. The frame 101 secures the transparent screen 151 to the user's face to position the transparent screen 151 in front of their eyes.

In addition, the wireless communication unit 110, the input unit 120, the sensing unit 140, the output unit 150 and the controller 180 may be provided in the frame 101. The user input unit 128 may also be provided in the frame 101 to input a user command thereto or a memory card slot may be provided in the frame 101 to expand the storage function. The camera 121 is configured to acquire image information and it may be arranged adjacent to the eyes to acquire images similar to the images acquired by the user's eyes.

As shown in the drawing, one camera 121 or two or more cameras 121 for three-dimensional information may be arranged near the eyes. The audio output unit 152 can also output a loud voice to allow several people at the same time like a speaker or output a sound that is hearable by the user near the ears via a receiver or earphones inserted in the ears, as shown in the drawing.

Figure 3:
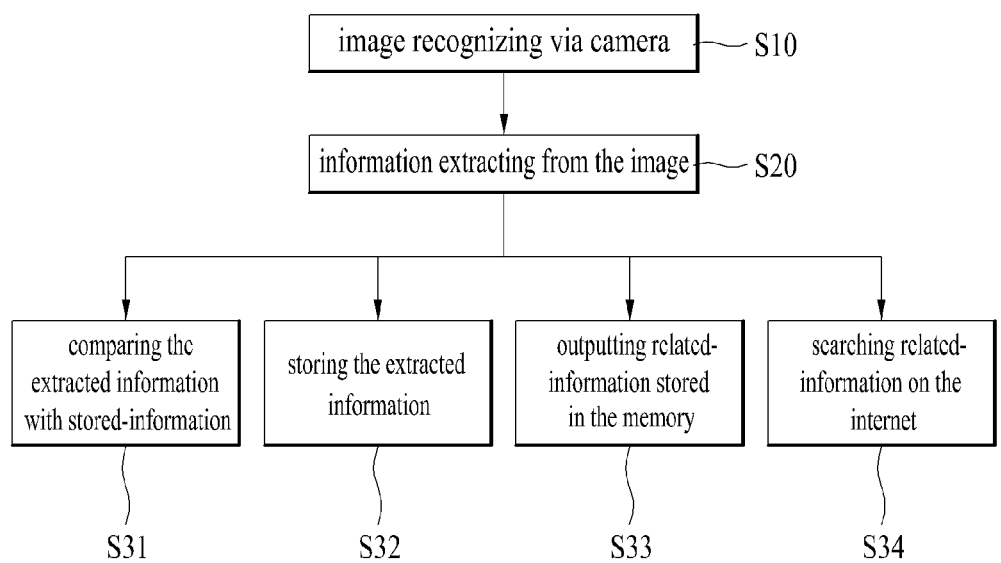
FIG. 3 is a flow chart illustrating a controlling method of a glass type mobile terminal according to one embodiment of the present invention.

Next, FIG. 3 is a flow chart illustrating a controlling method of a glass type mobile terminal according to one embodiment of the present invention. As shown, the image recognition unit 125 extracts information from the image recognized by the camera 121 (S10 and S20). The information may be a text data or a specific object. Specific examples of the information will be described later.

The controller 180 compares the extracted information with stored information (S31) or stores the extracted information in the memory 160 (S32). Alternatively, the controller 180 extracts to output associated information stored in the memory 160 to the transparent screen 151 (S33) or searches the associated information on the internet (S34).

The comparison between the extracted information and the pre-stored information (S31) means that the extracted information is identified with or similar to the stored information. When the extracted information corresponds to the information stored in the memory 160, the extracted information is recognized as corresponding to the stored information. When the extracted information is partially corresponding to the stored information, the extracted information is recognized as associated with the stored information.

When the storing of the extracted information in the memory 160, the acquired information may be simply stored. Alternatively, the extracted information is updated in the memory 160, when it is the information not repeated after the comparison with the stored information (S31). The newly acquired information may be added to the associated information, when it is associated with the stored information.

In the outputting of the associated information stored in the memory 160 (S33), the associated information stored in the memory 160 may be output to the transparent screen 151 or provided to the user via the audio output unit 150, when it the information associated with the acquired information is stored in the memory 160. The acquired information may be employed as a search word and information partially corresponding or similar to the acquired information may be searched and the searched information is provided.

In the internet searching for the associated information (S34), the wireless internet module 113 provided in the wireless communication unit may be used and associated information may be acquired on the internet, when there is no stored information or specific information associated with the extracted information is desired to acquire.

Embodiments of various function performed by the glass type mobile terminal 100 according to an embodiment of the present invention mentioned in reference to FIG. 3 will now be described.

Figure 4:
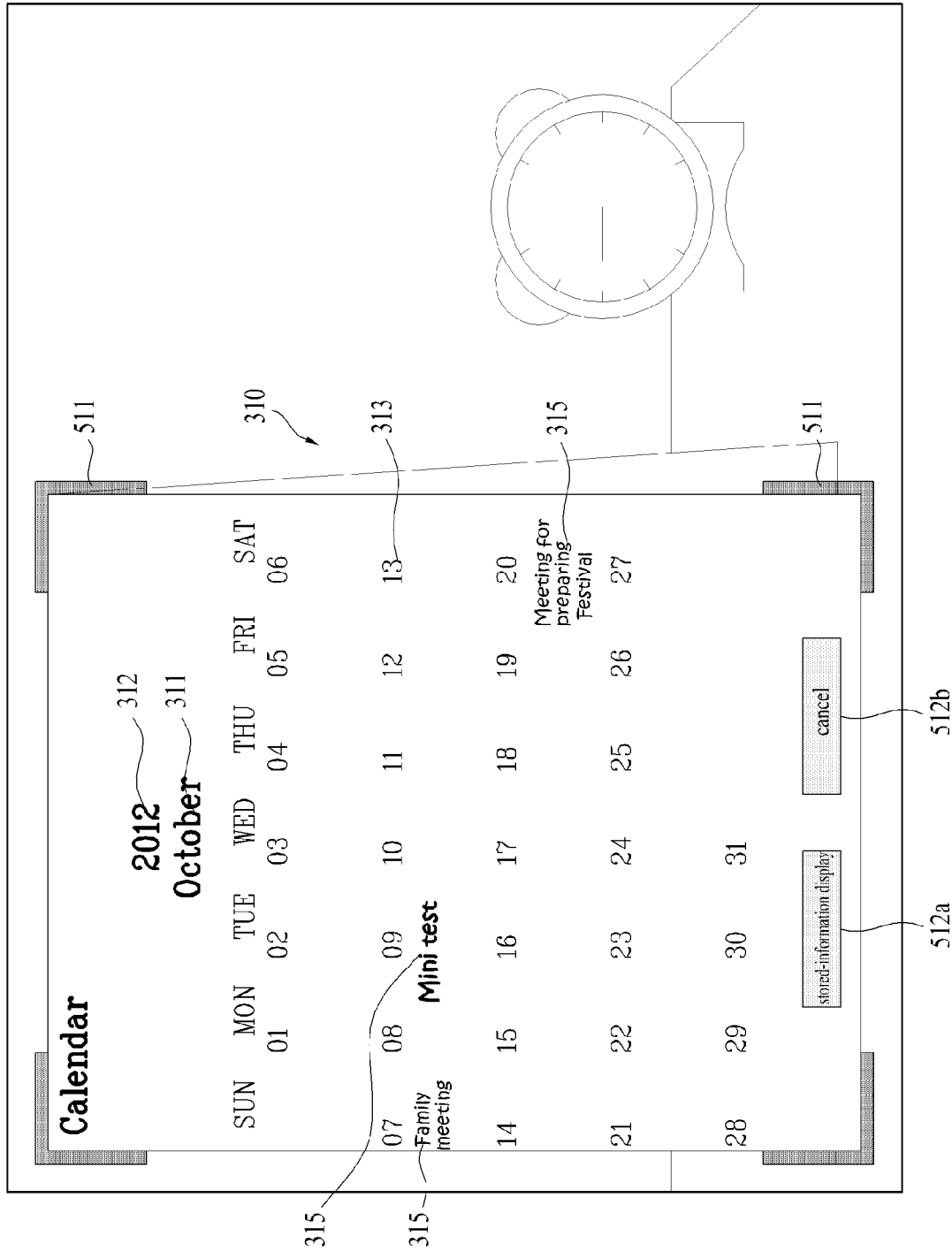
FIGS. 4 to 7 are diagrams illustrating an operational state of the glass type mobile terminal according to one embodiment of the present invention.

In particular, FIGS. 4 to 7 are diagrams illustrating an operational state of the glass type mobile terminal according to one embodiment of the present invention. In this embodiment, the image acquired by the camera 121 includes a calendar 310 as shown in FIG. 4.

When the user looks at the calendar 310 for more than a preset time period or in a close distance, information is extracted from the calendar 310. When one of the conditions or both of the conditions is or are satisfied, the information may be set to be extracted from the calendar 310. Alternatively, the acquiring of the information may be implemented by the user pressing the user input unit 128 attached to the glass type mobile terminal 100 or a voice command.

When the image recognition unit 125 recognizes the calendar 310, a marker 511 may be displayed on an area recognized as the calendar 310 as shown in FIG. 4. The information that can be extracted from the calendar 310 may correspond to the month 311, the year 312 and the date 313. Information on the year, month and date of the calendar may be searched through the memory 160. In other words, the user's scheduler may be searched and information stored in the scheduler by the user is searched in the memory 160.

In addition, searching for the stored information through the memory 160 may be implemented automatically. Alternatively, as shown in FIG. 4, the image recognition unit 125 may recognize the calendar 310 and extract information from the image. After that, buttons 512a and 512b may be output to the transparent screen 151 in a lower area of the transparent screen 151 to confirm whether the user desires to display the stored information. The buttons 512a and 512b are not physically touched but rather the user can input a voice command corresponding to the corresponding button or use the user input unit 128.

Figure 5:
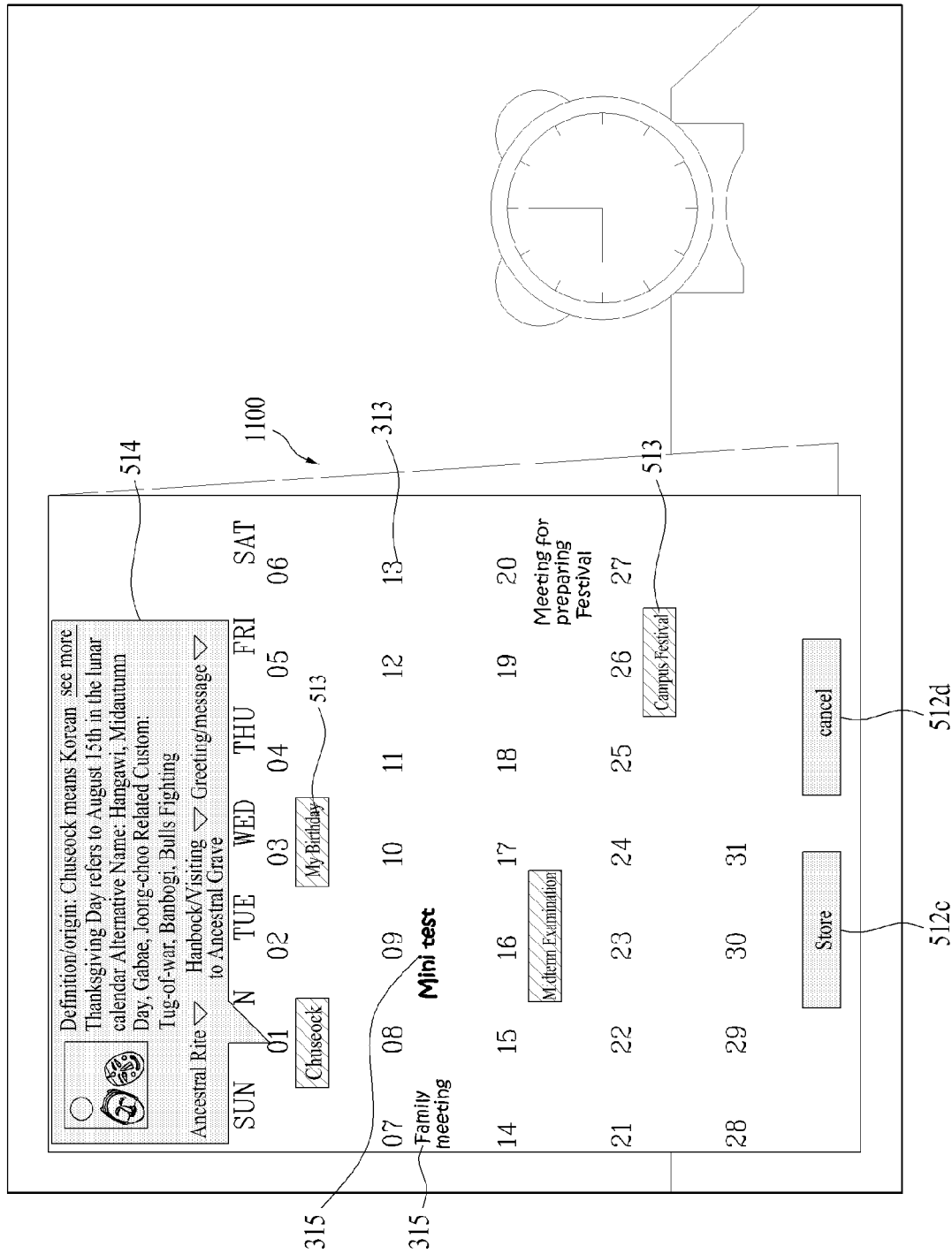

As shown in FIG. 5, the information 513 searched in the memory 160 may be output to the transparent screen 151, and overlapped with the calendar 310 the user is looking at. When the user moves, the size or position of the calendar 310 moves in the user's view according to the user's movement and the size or position of the stored information 513 output to the transparent screen 151 may be changed.

Figure 6:
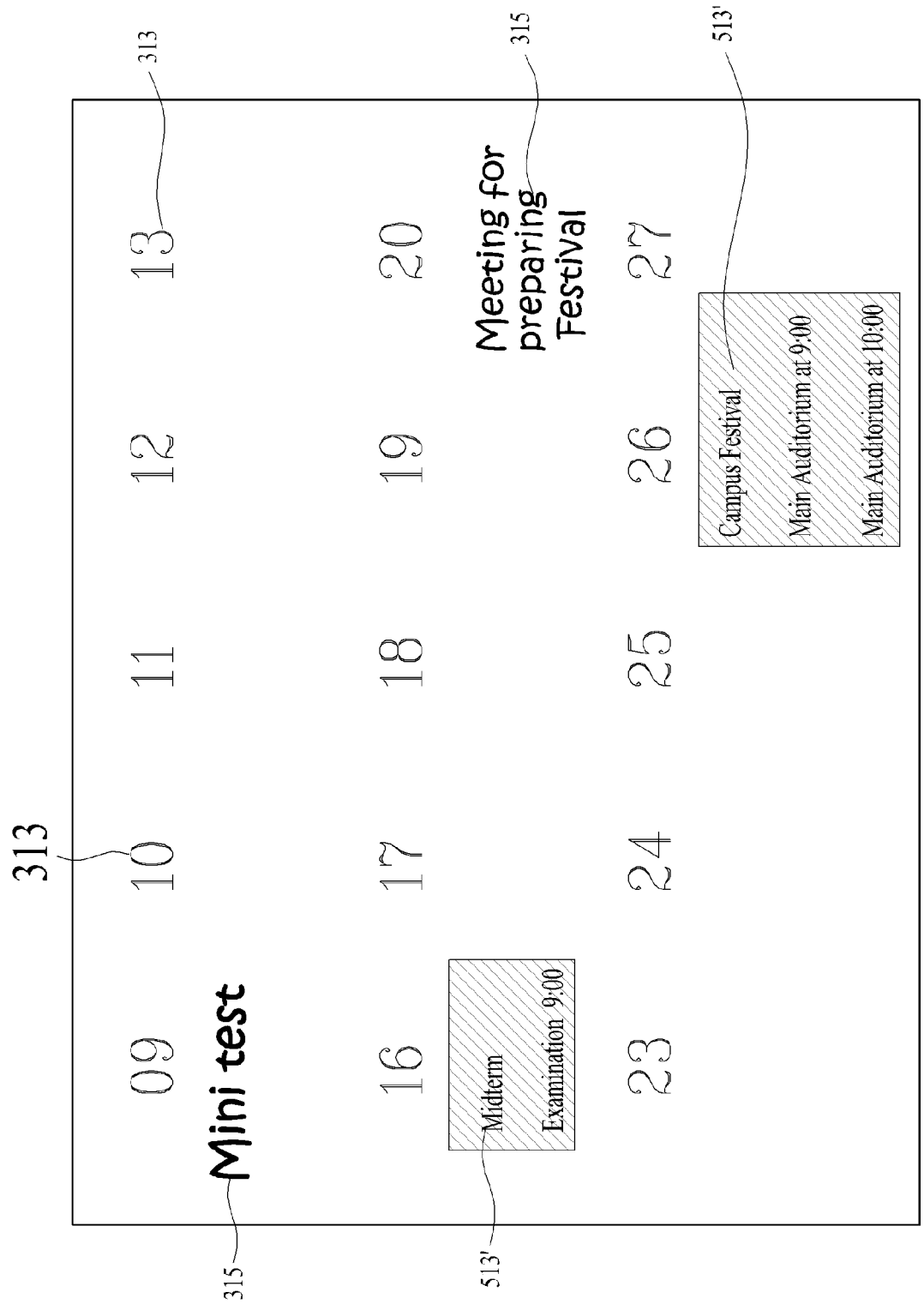

As shown in FIG. 6, when the size of the calendar 310 is increased, a space of the transparent screen 151 where the information is output can also be increased such that the stored information 513' can be displayed more specifically. When the user desires to acquire contents stored in the memory 160 and information associated with a specific data or period, information can be searched on an external internet via the wireless communication unit 110.

In addition, FIG. 5 illustrates that information 514 associated with Chuseok, Korean Thanksgiving Day is additionally searched and output to the transparent screen 151. The internet search may be implemented by the user's voice command or the user's input to the user input unit 128 or a gesture created by the user is read and recognized as a command by the image recognition unit 125.

According to another embodiment, when the user speaks "search information "a concert on October 13", the voice recognition unit 126 recognizes contents of the voice as a voice command, and the controller 180 searches information on the concert on October 13 via the wireless internet module 113 according to the command.

Figure 7:
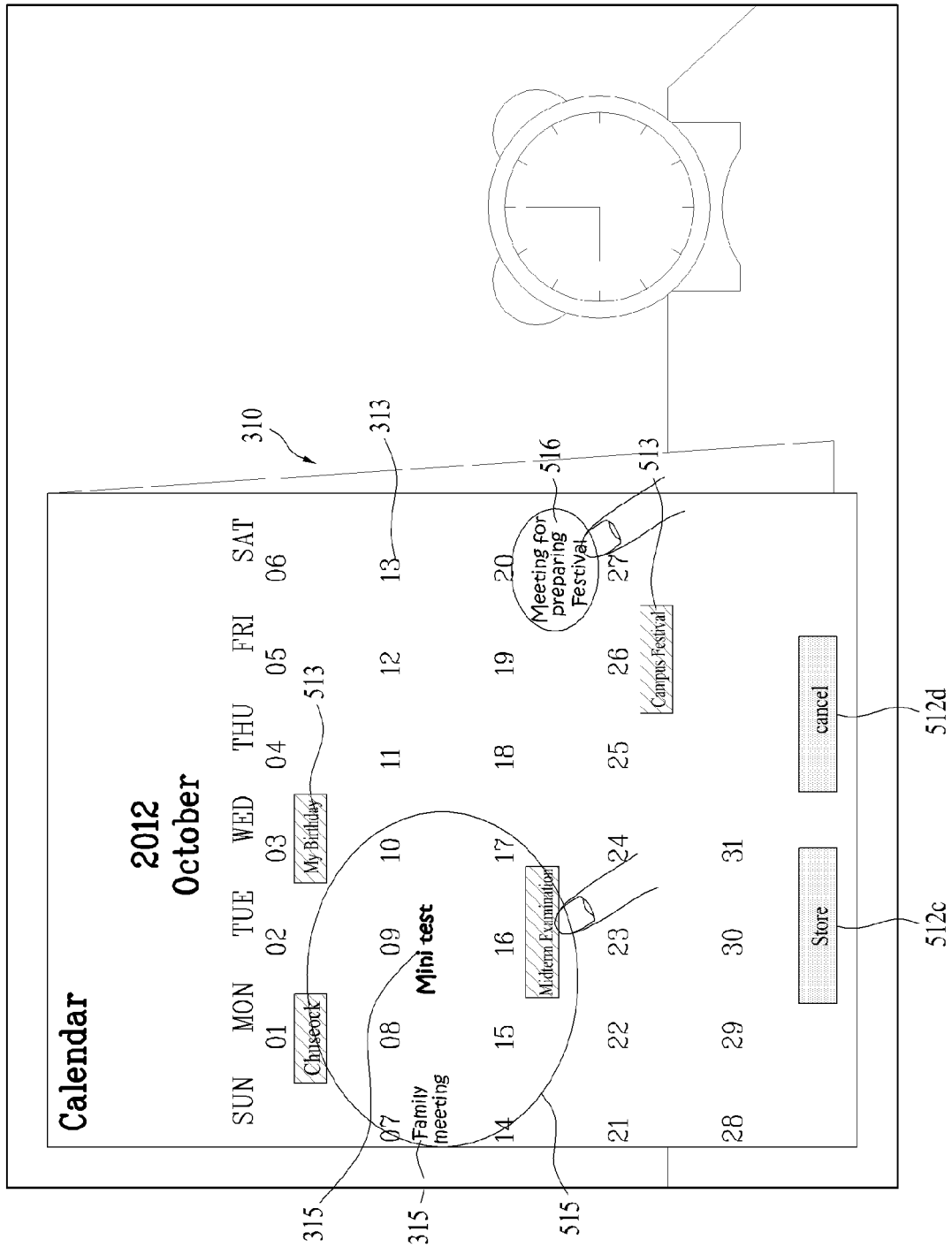

The information that can be extracted from the calendar 310 can be recognized from characters 315 written on the corresponding calendar 310, rather than the year, the month and the date 311, 312 and 313, to be stored as text data. In this example, it is checked whether there is overlap between the extracted information and the information stored in the memory 160 and the content not overlapped may be newly added. The storing may be performed by activating the button output to the transparent screen 151 by a voice command or the information of the areas 515 and 516 selected by the user may be stored as shown in FIG. 7.

Figure 8:
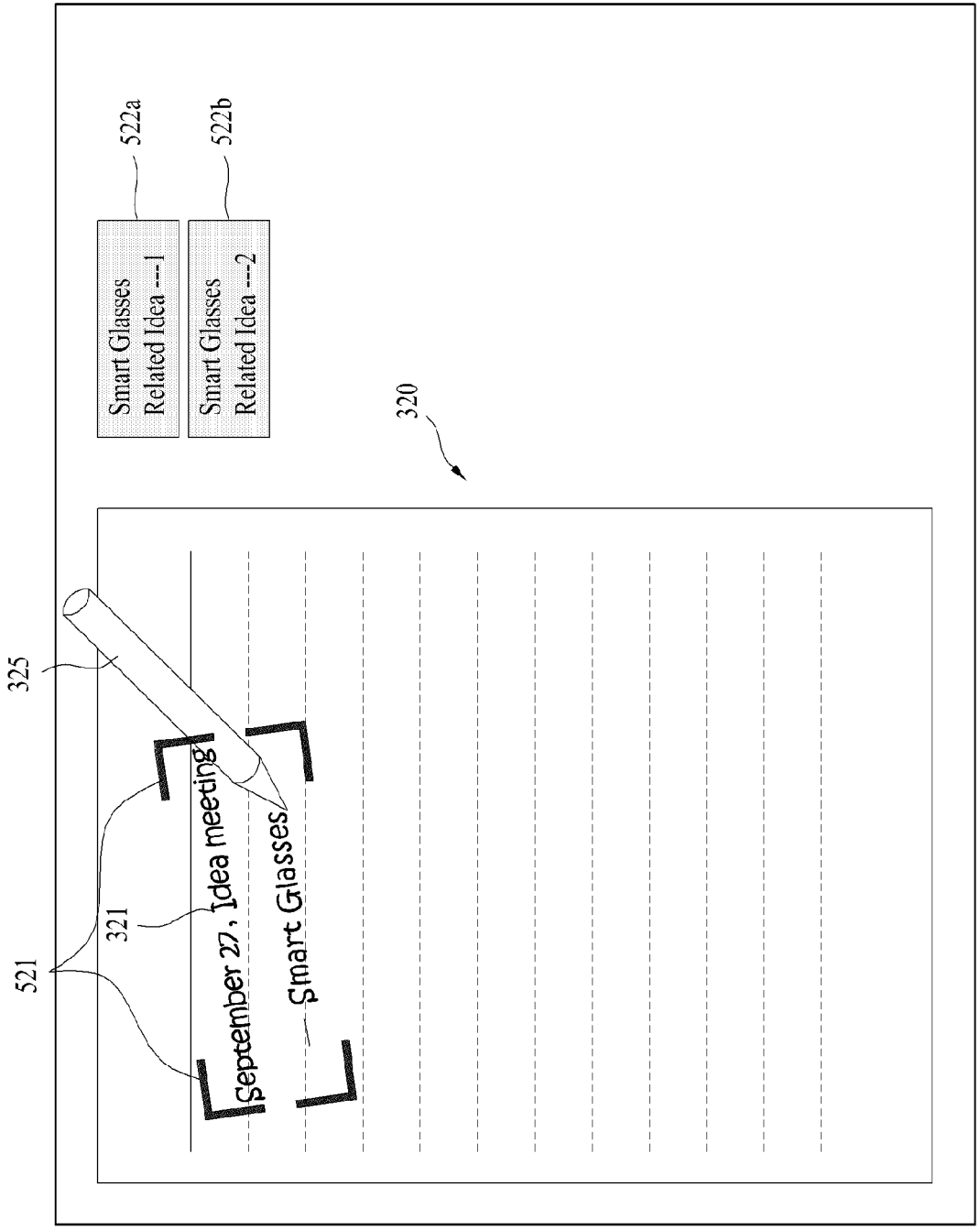
FIGS. 8 to 12 are diagrams illustrating an operational state of a glass type mobile terminal according to another embodiment of the present invention.

Next, FIGS. 8 to 12 are diagrams illustrating an operational state of a glass type mobile terminal according to another embodiment of the present invention. In this embodiment, the image photographed by the camera 121 is a memo 320 as shown in FIG. 8 and the image recognition unit 125 converts a character written on the memo into text data via OCR. The stored images result in a large data capacity and it is difficult to edit the images, and thus the hand writing on the memo is converted into the text data.

The extracted text data is compared with the information stored in the memory 160 and associated information is searched. For example, conference minutes or notes taken in a class may be made in connection with the contents stored in the memory 160 and the information is retrieved so as to identify the contents recorded in the last conference or class.

To extract the associated information, the extracted information is compared with the stored information as mentioned above and information corresponding to the extracted text data is extracted. In FIG. 8, characters 321 are recognized from the image of the memo 320. For example, text such as "conference minutes" and "smart glasses" related to a theme are extracted and searched for stored information. Even in this embodiment, the character recognized as an object for information extraction may be displayed with a marker 521.

Figure 9:
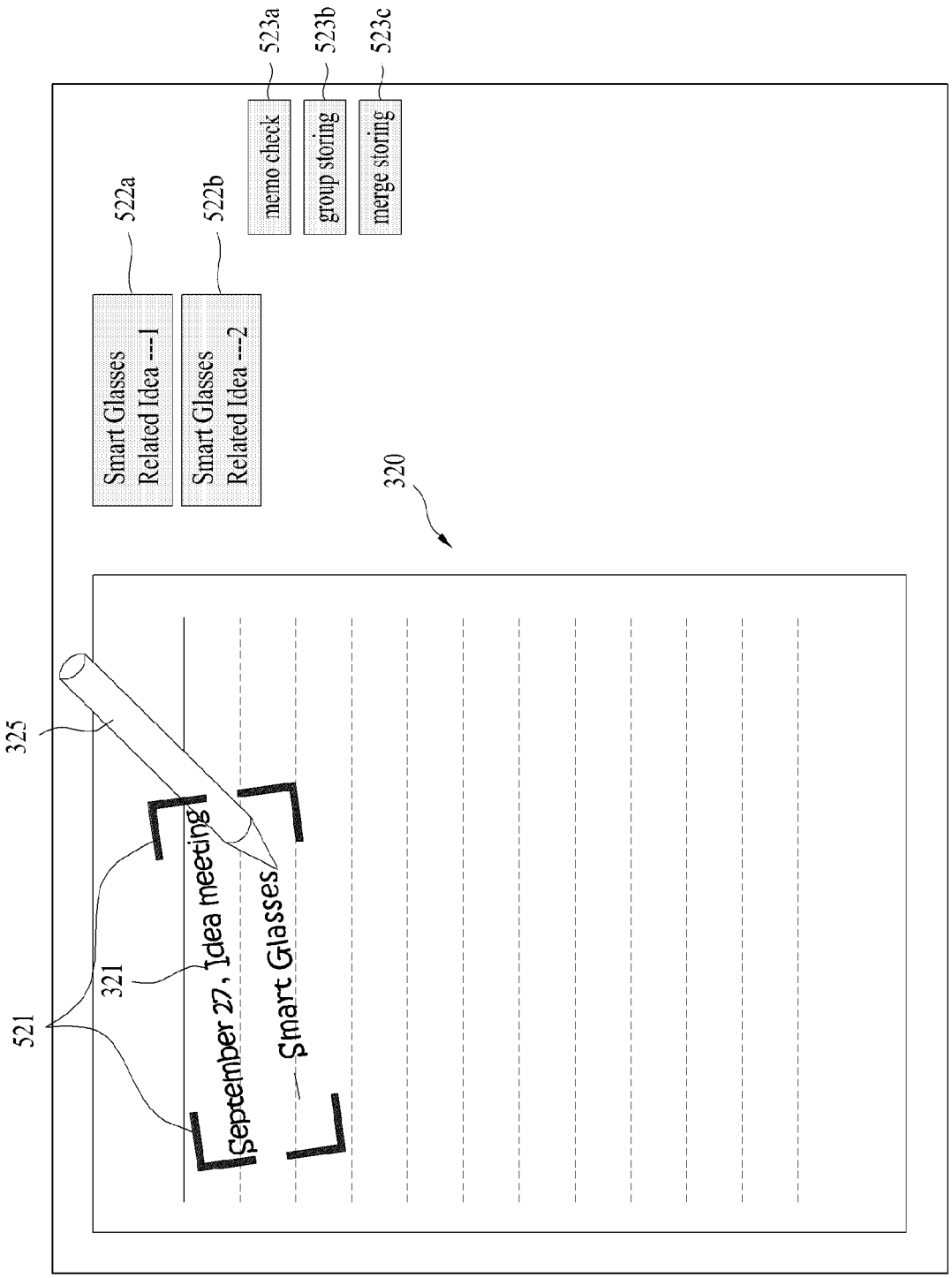

Once related information is retrieved from the memory, related information 522a and 522b may be displayed on the transparent screen 151 as shown in FIG. 8. All of the contents possessed by the related information do not have to be displayed and only a name or date can be displayed in a thumbnail mode. When selecting the corresponding memo, the user may select whether to check contents of the memo 523a, to store a new memo grouped together with the selected memo 523b, or to store a memo following the selected memo 523c, as shown in FIG. 9.

Figure 10:
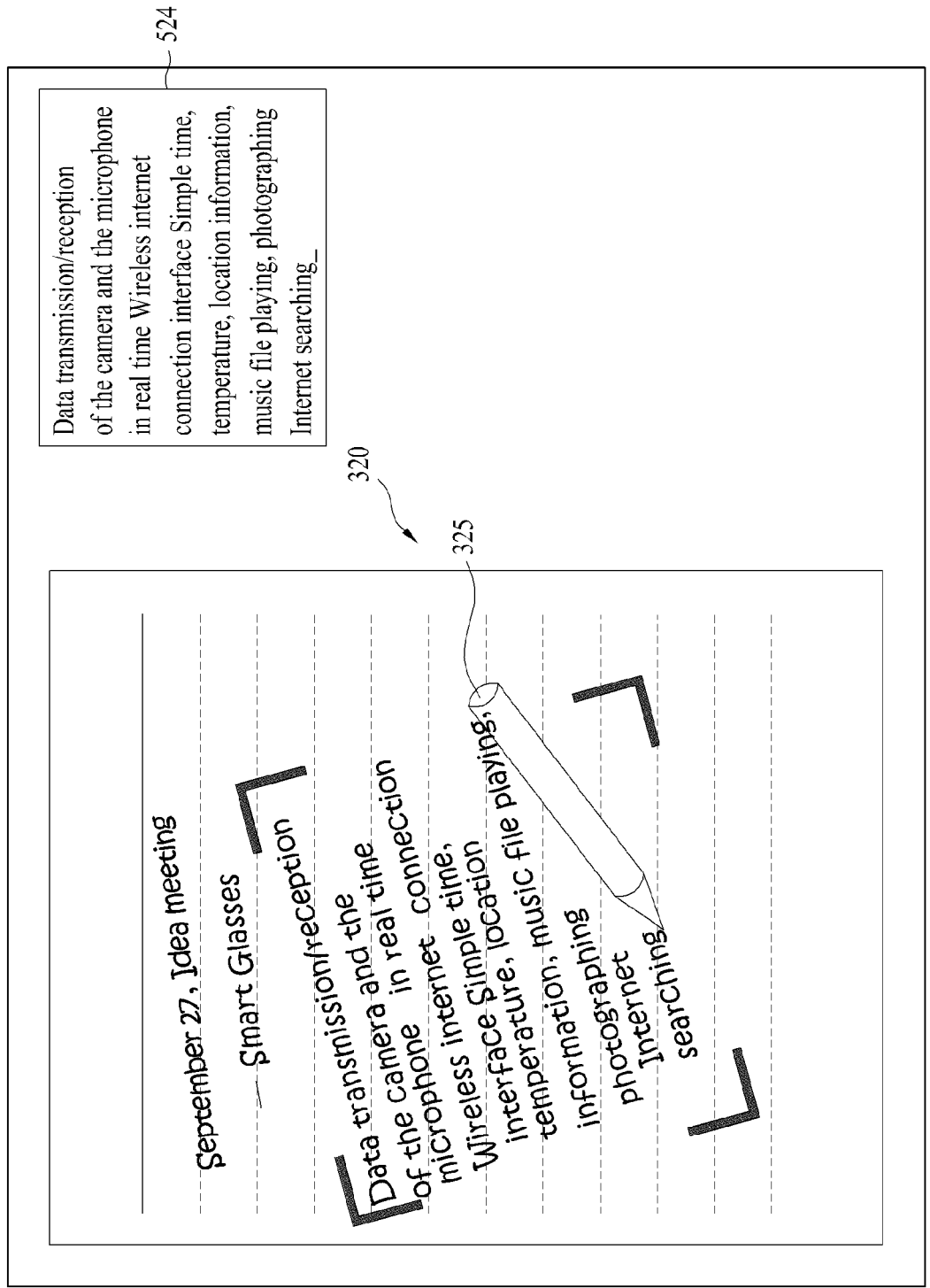
Figure 11:
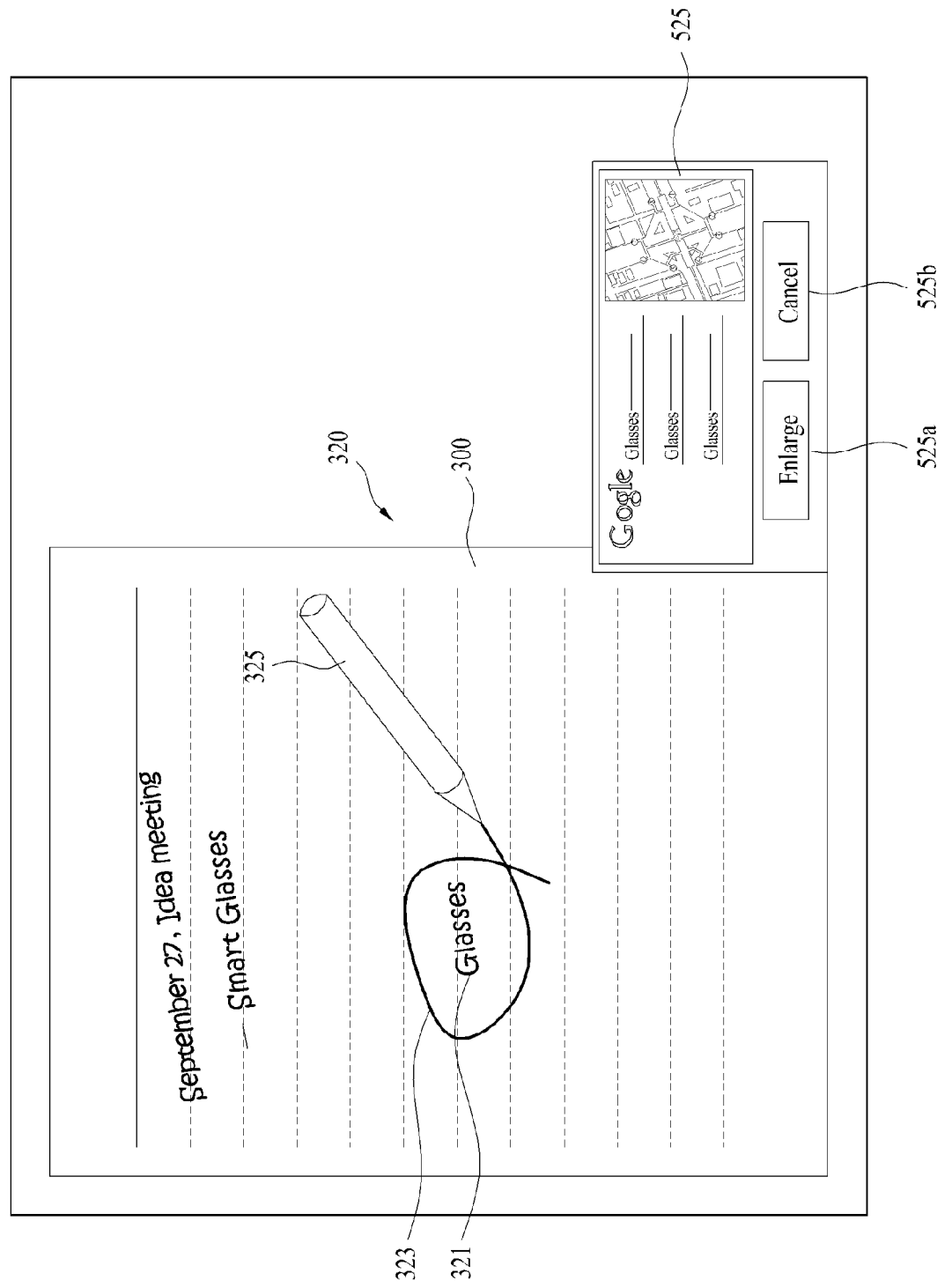

Once the user starts to make a memo, the image recognition unit 125 can recognize characters newly written by the user in real time and convert the recognized characters into a digital text. Further, the converted text may be displayed 524 on the transparent screen 151 as shown in FIG. 10, to allow the user to check whether the text conversion is performed appropriately.

When wanting to search a specific content of the memo on the internet, the user may select the specific content and search the selected content via the wireless internet module 113. Alternatively, the searching may be performed by a voice command. However, sometimes it is difficult to use the voice command when the memo is taken in a library or during a conference.

Thus, in the present invention, when a gesture 323 configured to specify a searching content 321 is made by the user, the image recognition unit 125 may recognize the gesture 323 as a user command. When wanting to check details of the searched content thumbnail 525 displayed on the transparent screen 151, an enlarge button 525a may be activated to check the searched content in a large screen.

Figure 12:
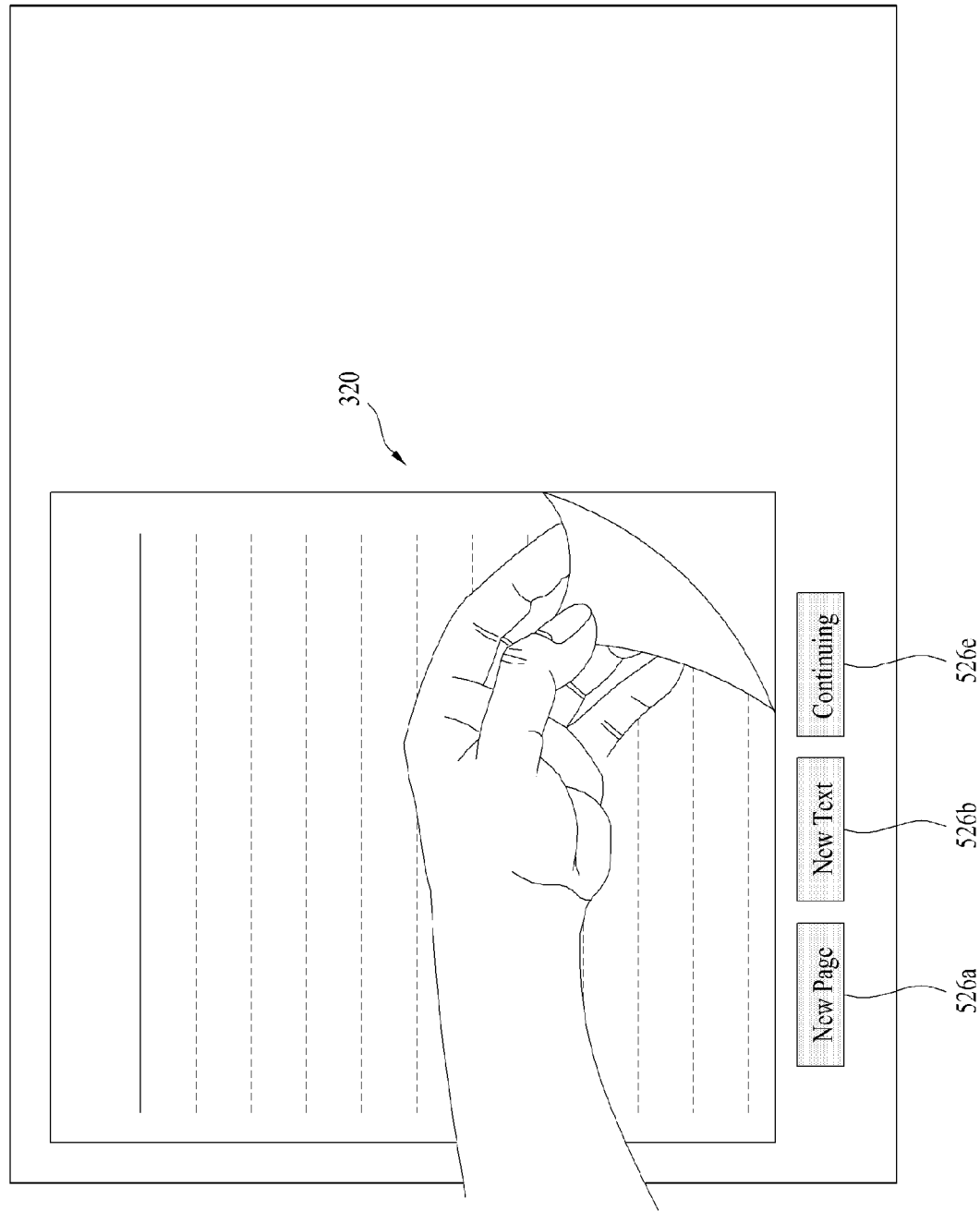

A memo pad generally has a limited size. As shown in FIG. 12, when the user starts a new page, the image recognition unit 125 may recognize the page replacement and ask the user whether the searched content should be stored as a new page 526a, to store it as a new text 526b or to store it in one page, following the former page.

Next, FIGS. 13 to 18 are diagrams illustrating an operational state of a glass type mobile terminal according to another embodiment of the present invention. In this embodiment, the motion picture photographed by the camera 121 includes an object 330', and the image recognition unit 125 extracts and process an image of the corresponding object.

Figure 13:
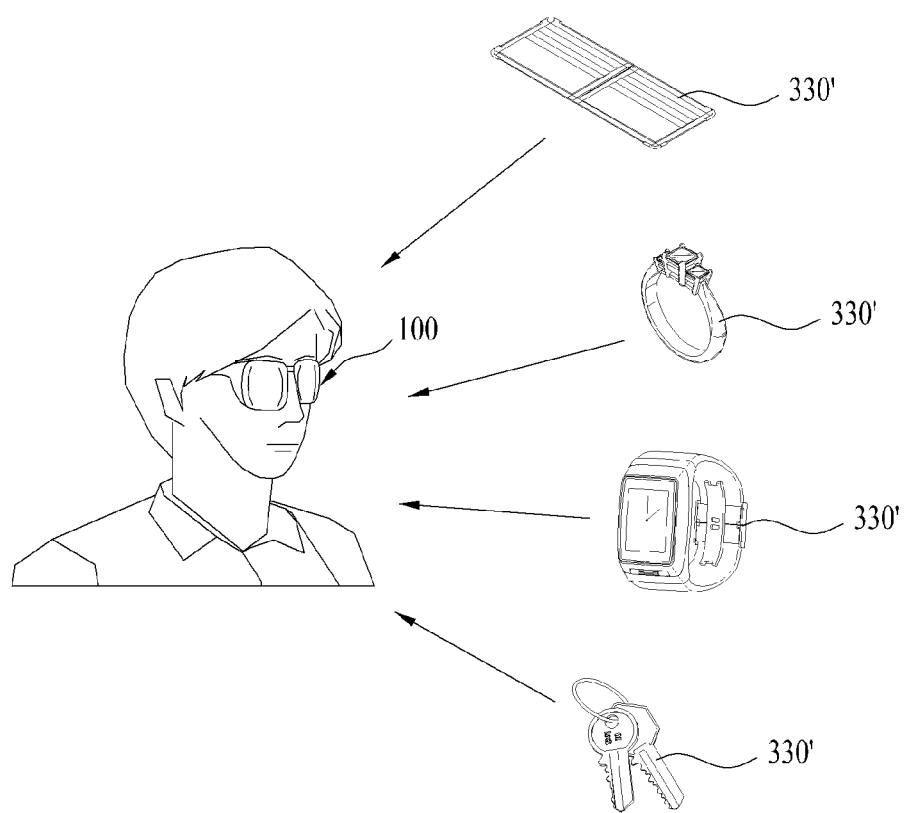
FIGS. 13 to 18 are diagrams illustrating an operational state of a glass type mobile terminal according to a further embodiment of the present invention.

The user may record the image of the object 330' in the memory 160 as stored information. For example, as shown in FIG. 13, images of objects 330' having the danger of being lost such as a wallet, a watch and a key are stored. Preferably, a plurality of images photographed in as many directions as possible are stored. Such object having the images stored in the memory can be referenced to as "a designated object".

Figure 14:
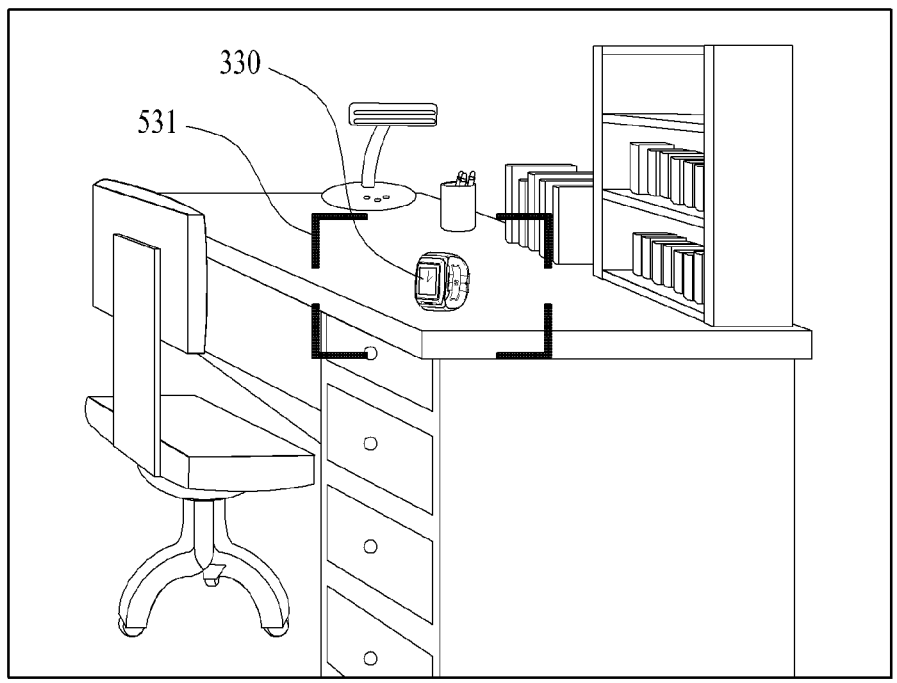

As shown in FIG. 14, an image of the object 330 is extracted from the motion picture photographed by the camera 121, while being distinguished from the background, and the extracted image is compared with the image of the designated object 330' stored in the memory 160 to check whether the extracted image corresponds to the image of the designated object 330'.

Figure 15:
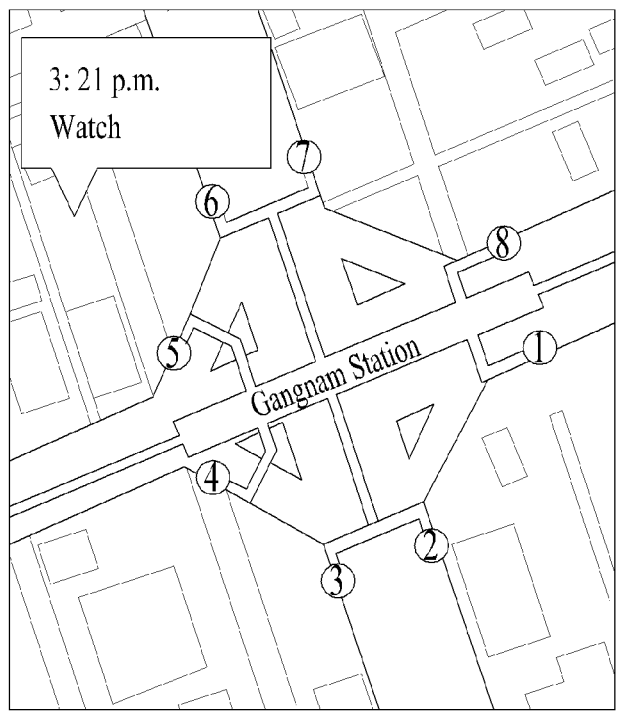

When the extracted image of the object 330 corresponds to the image of the designated image 330' based on the result of the comparison, the time and the place of the motion picture photographed by the camera 121 is stored (see FIG. 15). In other words, a log record file of the designated object 330' is generated.

If the user loses the designated object 330', the log record of the corresponding object is searched and the last place where the designated object 330' is seen and photographed can be provided to make it easy for the user to find the designated object 330'.

Alternatively, when the image of the object 330 extracted from the motion picture photographed by the camera 121 is identified with the image of the designated object 330', information related with the designated object 330' can be output. The stored information may be output on the transparent screen 151 as a text or to the audio output unit 152 as a voice.

Figure 16:
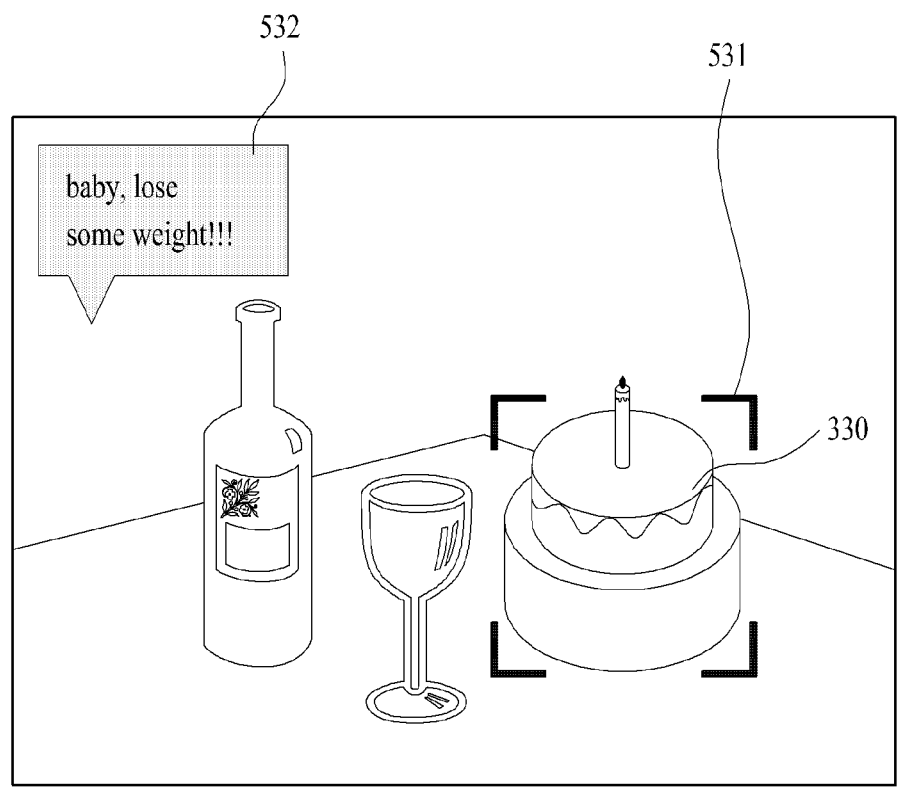

For example, when the user is on a diet as shown in FIG. 16, high calorie foods including meat and a cake may be set as designated objects 330'. When the image of the extracted object 330 is identified with the designated objects 330', a message telling the user not to eat the object 330 may be output.

Figure 17:
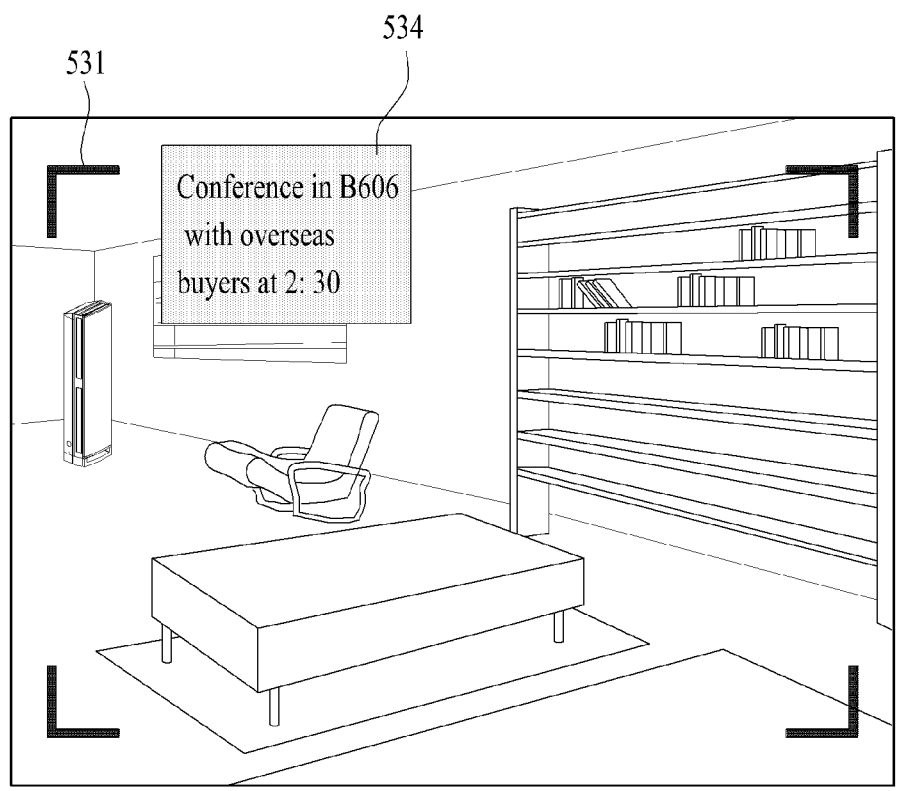
Figure 18:
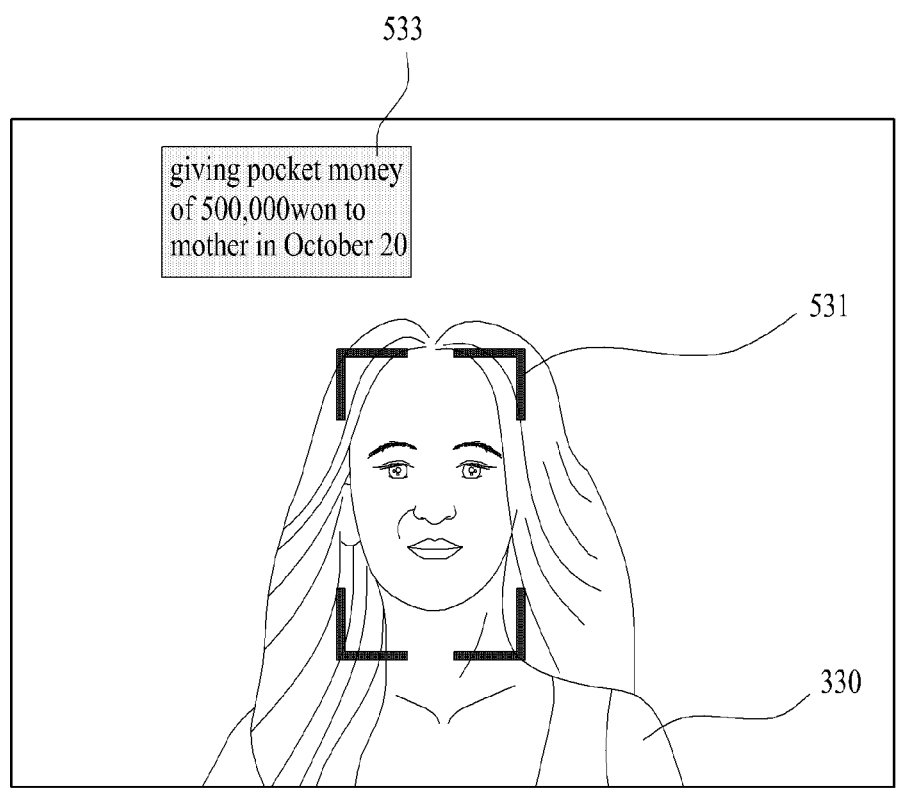

Alternatively, when a conference room is set as a designated object 330' as shown in FIG. 17, information 534 on a conference schedule may be extracted from the memory 160 and output. Alternatively, when a specific person's face is set as the designated object 330' as shown in FIG. 18, a memo 533 related with a specific person may be searched from the memory 160 and output.

When the designated object 330' is a specific object as shown in FIG. 14 or 17, a high match rate between the image of the designated object 330' and the extracted image of the object 330 makes the object 330 corresponding to the designated object 330'. When the designated object 330' is an object as shown in FIG. 16, a low match rate between the images may make the object 330 set to be corresponding to the designated object 330'.

When the extracted image of the object includes time information as shown in FIG. 17, only information close to the corresponding time may be provided or information on the time several hours before the time may be provided.

Figure 19:
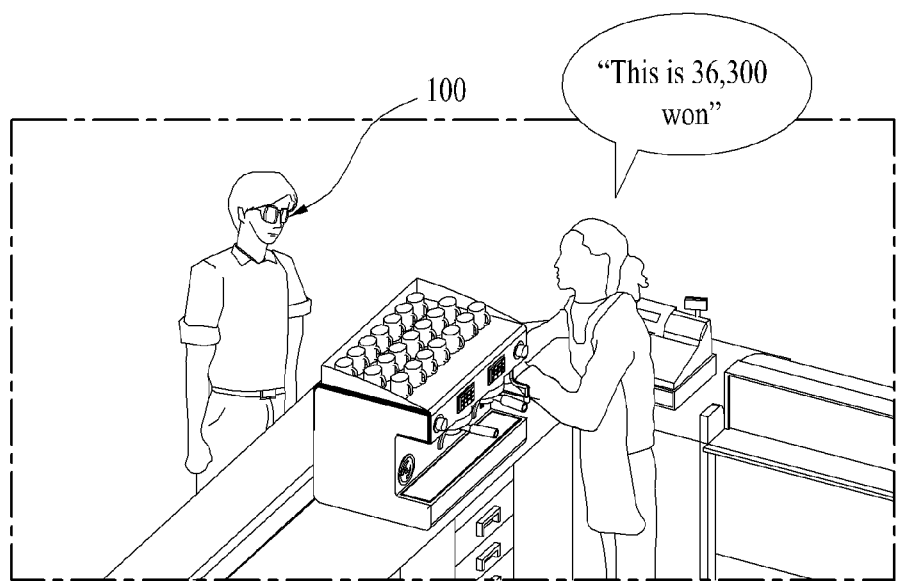
Figure 20:
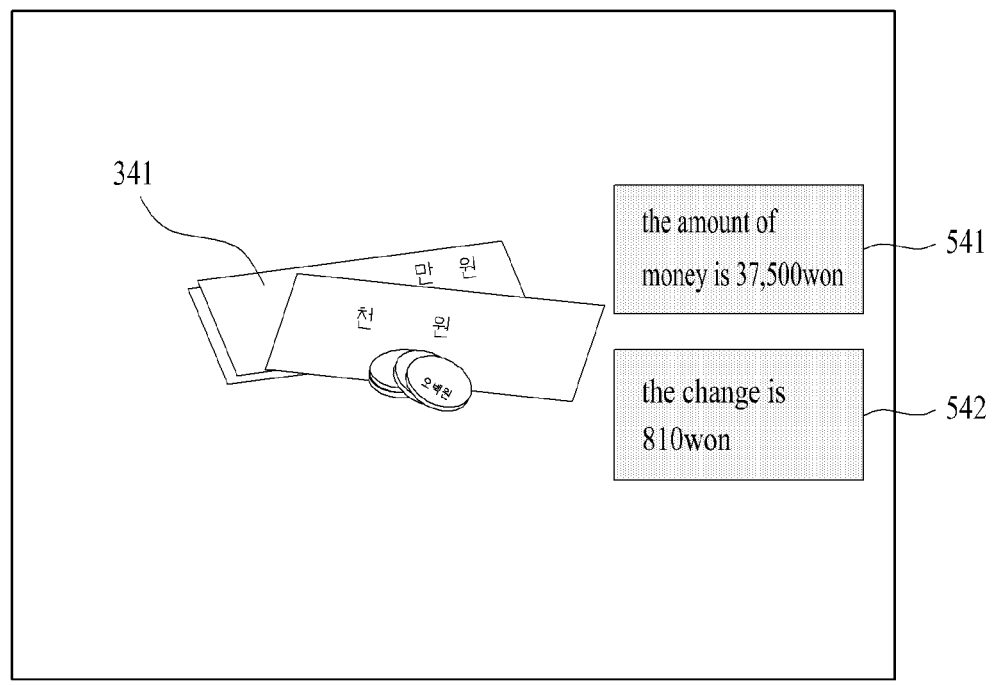

Next, FIGS. 19 to 22 are diagrams illustrating an operational state of the glass type mobile terminal according to still another embodiment of the present invention. In this embodiment, the image is money 341 such as a bill and a coin as shown in FIG. 20 and the image recognition unit 125 extracts the amount 541 of the money.

When a sales clerk says the amount of money the user has to pay as shown in FIG. 19, the voice recognition unit including the microphone 122 extracts the amount the user has to pay as digital information. The amount of money the user has to pay may be the voice of the clerk or an image including the amount, such that the image recognition unit 125 may extract the amount of the money the user has to pay from the image.

The amount of the money 541 is extracted from the image of the money 341 the user takes outs and gives to the clerk as digital information as shown in FIG. 20. The amount of the money the user has to pay is compared with the amount 541 of the money the user took out, such that the change 542 may be calculated based on the result of the comparison.

Figure 21:
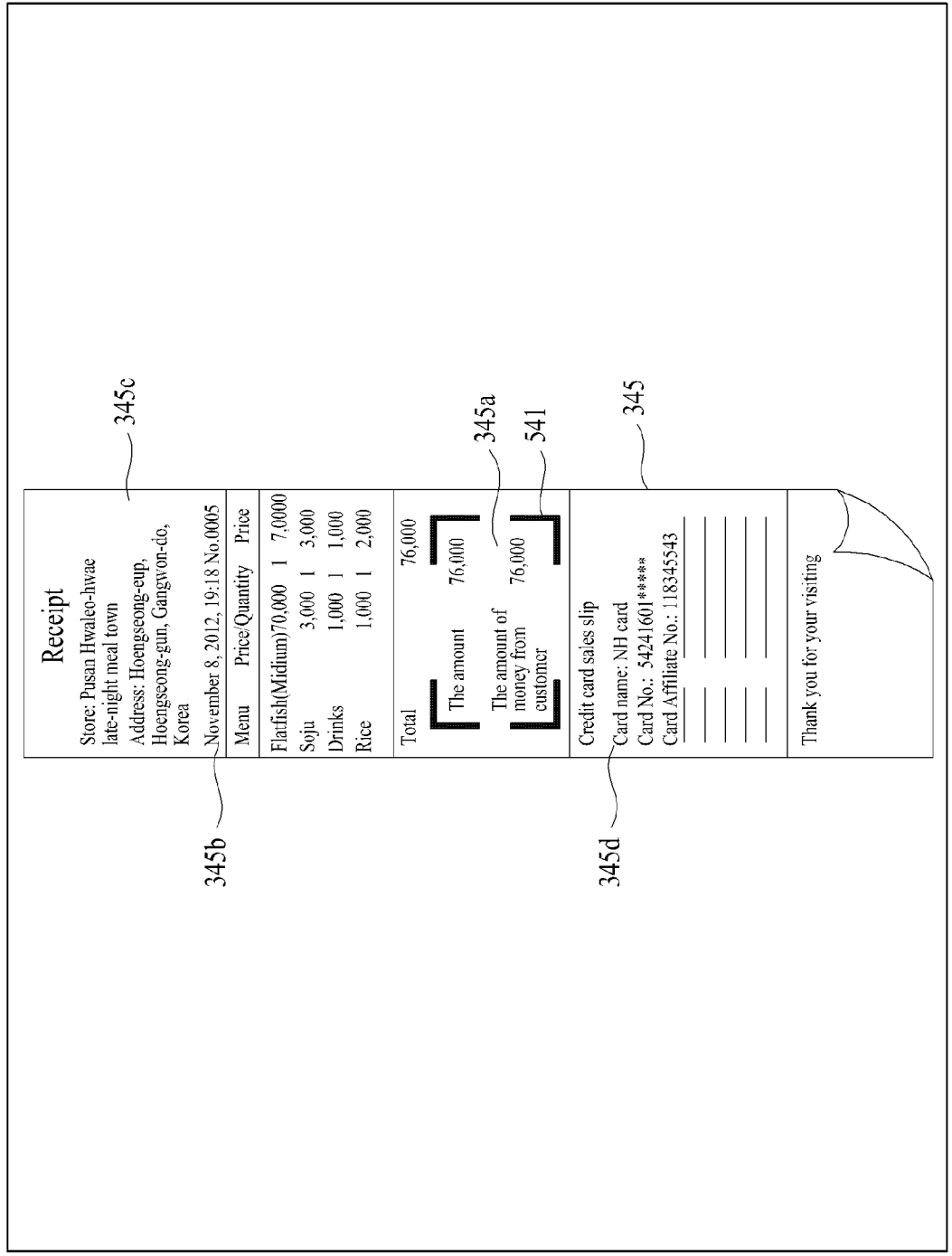

Next, the image photographed by the camera 121 is a receipt 345 as shown in FIG. 21 and the information extracted from the receipt 345 may include the amount 345a and the date 345b recorded on the receipt 345. In addition, information on the place 345c or a credit/debit card 345d used may be extracted from the image of the receipt 345. The controller 180 can then add the extracted information 345a, 345b, 345c and 345d to account book stored in the memory 160. In this embodiment, the user can conveniently maintain their accounts, without having to manually input the information.

As described above, the images acquired according to the user's view may be processed and various types of information may be extracted, such that the extracted information may be input or compared with the stored information or such that the stored information may be searched to provide the searched information to the user. Accordingly, new information can be acquired easily and utilized.

Furthermore, the information related to an object that could be easily lost or the corresponding object 330 may be provided to the user to assist the user's power of memory.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A glass type mobile terminal comprising:
a transparent screen;
a frame configured to secure the transparent screen in front of a user's eyes wearing the glass type mobile terminal;
a camera mounted to the frame and configured to photograph an image in front of the user's eyes;
a memory;
an image recognition unit configured to extract information from the image photographed by the camera; and
a controller configured to:
compare the extracted information with related information stored in the memory, and
display the related information to the transparent screen on the transparent screen along with the captured image,
wherein the image recognition unit is further configured to extract the information when one object occupies a preset range of areas included in the image.

2. The glass type mobile terminal according to claim 1, wherein the controller is further configured to only store the extracted information from the image photographed by the camera.

3. The glass type mobile terminal according to claim 1, further comprising:
an audio output module configured to output sound information,
wherein the controller is further configured to output the related information via the audio output module.

4. The glass type mobile terminal according to claim 1, wherein the image includes a calendar, the extracted information includes at least one of a year, month and date of the calendar and a memo written on the calendar, and the related information in the memory corresponds to at least one of the year, month, date and memo written on the calendar, and
wherein the controller is further configured to superimpose the related information on the calendar.

5. The glass type mobile terminal according to claim 4, wherein the controller is further configured to zoom in/out and move the related information on the transparent screen according to the user's movement.

6. The glass type mobile terminal according to claim 4, further comprising:
a wireless communication unit connected with the internet,
wherein the controller is further configured to search the internet for the related information related to the calendar and superimpose the related information on the transparent screen.

7. The glass type mobile terminal according to claim 1, wherein the image is a memo and the extracted information is a character written on the memo,
wherein the controller is further configured to display at least part of stored-information corresponding to the written character on the transparent screen, and
wherein the controller is further configured to select whether to merge or group the information extracted from the memo with the related information or store the extracted information as independent information.

8. The glass type mobile terminal according to claim 7, wherein the controller is further configured to display the stored-information as a thumbnail image.

9. The glass type mobile terminal according to claim 1, wherein the image is a memo and the extracted information is a character written on the memo, and
wherein the image recognition unit is further configured to perform a character recognition process for recognizing a character newly written in real time on the memo, convert the recognized character into a text, and display the converted text on the transparent screen.

10. The glass type mobile terminal according to claim 1, wherein the image is a memo and the extracted information is a character written on the memo, and
wherein the controller is further configured to prompt the user to store the memo as a new document or a new page.

11. The glass type mobile terminal according to claim 1, further comprising:
a wireless communication unit connected to the internet,
wherein the image is a memo and the extracted information is a character written on the memo, and
wherein the controller is further configured to search the internet for a characteristic of a character selected from the memo and display information about the searched characteristic on the transparent screen.

12. The glass type mobile terminal according to claim 1, further comprising:
a microphone configured to convert a voice of a cashier indicating an amount of money needed to be paid into a digital signal,
wherein the image includes an image of money the user is paying, and
wherein the controller is further configured to:
compare the converted voice with the image of the money the user is paying,
calculate an amount of change due to the user, and
output the calculated amount of change on the transparent screen or the audio output module.

13. The glass type mobile terminal according to claim 1, wherein the image is a receipt, and the extracted information corresponds to individual items included in the receipt, and
wherein the controller is further configured to update an account book stored in the memory to include the extracted information.

14. A glass type mobile terminal comprising:
a transparent screen;
a frame configured to secure the transparent screen in front of a user's eyes wearing the glass type mobile terminal;

a camera mounted to the frame and configured to photograph an image in front of the user's eyes, the image includes an object, a memory storing related information, the related information includes at least one image of the object photographed at one or more angles, an image recognition unit configured to extract information or the object from the image photographed by the camera;

an audio output module configured to output sound information;

a location information module configured to recognize a location of the glass type mobile terminal; and a controller configured to:
- compare the extracted information or object with the related information stored in the memory,
- determine whether the object in the photographed image corresponds to the object included in the related information,
- record the location and photographed time in the memory as a log record for the object, when the object in the photographed image corresponds to the object included in the related information, and
- output the related information or the log record via the transparent screen or the audio output module.

15. The glass type mobile terminal according to claim 14, wherein the controller is further configured to display additional information of the object on the transparent screen or output the additional information via the audio output module, when the object in the photographed image corresponds to the object included in the related information.

16. The glass type mobile terminal according to claim 15, wherein the additional information includes a designated time when a current time is approaching the designated time.

17. A glass type mobile terminal comprising:
a transparent screen;
a frame configured to secure the transparent screen in front of a user's eyes wearing the glass type mobile terminal;
a camera mounted to the frame and configured to photograph an image in front of the user's eyes, the image includes a memo;
a memory;
an image recognition unit configured to extract information from the image photographed by the camera, the extracted information is a character written on the memo; and
a controller configured to:
- compare the extracted information with related information stored in the memory,
- display the related information to the transparent screen on the transparent screen along with the captured image, and
- prompt the user to store the memo as a new document or a new page.

18. The glass type mobile terminal according to claim 17, wherein the controller is further configured to display at least part of stored-information corresponding to the written character on the transparent screen, and
wherein the controller is further configured to select whether to merge or group the information extracted from the memo with the related information or store the extracted information as independent information.

19. The glass type mobile terminal according to claim 17, wherein the image recognition unit is further configured to perform a character recognition process for recognizing a character newly written in real time on the memo, convert the recognized character into a text, and display the converted text on the transparent screen.

20. The glass type mobile terminal according to claim 17, further comprising:
a wireless communication unit connected to the internet,
wherein the controller is further configured to search the internet for a characteristic of a character selected from the memo and display information about the searched characteristic on the transparent screen.

* * * * *